(12) United States Patent
Wolf

(10) Patent No.: US 6,741,812 B2
(45) Date of Patent: May 25, 2004

(54) SYNCHRONOUS DIGITAL COMMUNICATIONS SYSTEM

(75) Inventor: Michael Joachim Wolf, Mundelsheim (DE)

(73) Assignee: Alcatel, Paris (FR)

( * ) Notice: Subject to any disclaimer, the term of this patent is extended or adjusted under 35 U.S.C. 154(b) by 582 days.

(21) Appl. No.: 09/729,780

(22) Filed: Dec. 6, 2000

(65) Prior Publication Data

US 2001/0003485 A1 Jun. 14, 2001

(30) Foreign Application Priority Data

Dec. 11, 1999 (DE) .......................... 199 59 815

(51) Int. Cl.$^7$ .......................... H04J 14/02; H04L 12/28
(52) U.S. Cl. .......................... 398/79; 398/50; 398/91; 398/154; 370/503; 370/907; 375/356
(58) Field of Search .................. 398/50, 79, 91, 398/154; 370/503, 907; 375/356

(56) References Cited

U.S. PATENT DOCUMENTS

| 5,886,996 | A | | 3/1999 | Wolf |
| 5,917,870 | A | | 6/1999 | Wolf |
| 6,529,300 | B1 | * | 3/2003 | Milton et al. .............. 398/59 |
| 6,535,313 | B1 | * | 3/2003 | Fatehi et al. .............. 398/101 |
| 6,587,470 | B1 | * | 7/2003 | Elliot et al. .............. 370/404 |
| 2002/0037013 | A1 | * | 3/2002 | Grammel .............. 370/430 |

FOREIGN PATENT DOCUMENTS

| DE | 44 42 506 A1 | 6/1996 |
| DE | 44 46 511 A1 | 6/1996 |

OTHER PUBLICATIONS

Powell, Cubbage, Ferrant, and Wolf; Synchronization and Timing of SDH Networks; Electrical Communication, 4$^{th}$ Quarter 1993, pp. 349–358.

* cited by examiner

*Primary Examiner*—Kinfe-Michael Negash
(74) *Attorney, Agent, or Firm*—Sughrue Mion, PLLC

(57) ABSTRACT

The synchronous digital communications system according to the invention serves to transmit electric signals optically. The electric signals to be transmitted are converted from electrical to optical form (E/O1, E/O2, E/On) and then transmitted using wavelength division multiplexing (WDM) or dense wavelength division multiplexing (DWDM). A synchronization manager and a connection manager are provided. The synchronization manager is adapted to configure dedicated optical synchronization links. The connection manager is adapted to configure switched optical communication links from a pool of wavelengths, taking account of the dedicated synchronization links only. This has the advantage that independently of the switched communication links, synchronization is constantly ensured throughout the system. Each network element (NE1, NE2, NE3) has at least one interface unit that is reserved for synchronization and that continuously receives signals at the wavelength ($\lambda_1$) reserved for synchronization.

7 Claims, 1 Drawing Sheet

SYNCHRONOUS DIGITAL COMMUNICATIONS SYSTEM

Figure 1:
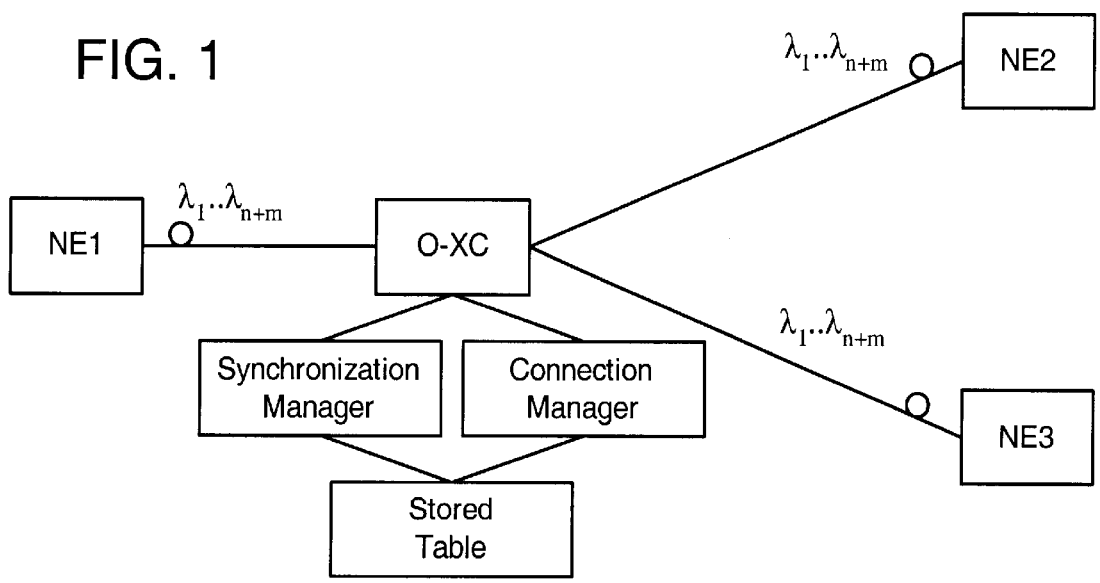

This invention relates to a synchronous digital communications system as set forth in the preamble of claim 1 and to a method of optically transmitting electric signals as set forth in the preamble of claim 6.

A synchronous digital communications system is based, for example, on a standard for synchronous digital hierarchy (SDH/SONET standard). In such a digital communications system, individual network elements are interconnected by different transmission media (e.g., copper cables, optical fiber waveguides, or radio links). A network element is, for example, an exchange for a public switched telephone network, a cross-connect, or an add/drop multiplexer. To synchronize the network elements, two techniques are known: master-slave synchronization and mutual synchronization.

The master-slave technique, also referred to as hierarchical synchronization, uses a unique primary reference clock for synchronization of a first hierarchical level of network elements, also referred to as nodes. These nodes give their derived clocks to the next level nodes, and so on. In the mutual synchronization technique, all nodes are at a peer level interconnected by the existing digital links. Each node calculates a mean phase value of the incoming clock signals and its own internal clock.

From DE 44 46 511 it is known to avoid timing loops by grouping interface units of each network element that are used for synchronization in two classes, thereby defining a synchronization hierarchy. The interface units of one of the classes ignore received synchronization signals, and the interface units of the other class transmit synchronization signals (clock references).

Network elements have a number of interface units, which generally all serve to receive and transmit information signals, i.e., speech, data. Some predefined interface units additionally serve to receive and/or transmit synchronization signals. All-electric synchronous digital communications systems have nonswitched physical connections. A synchronization hierarchy is defined by predetermined paths. If section-by-section radio or point-to-point optical transmission is used, the electric signals (information+ synchronization) are switched through transparently. In this way, the network element interface units used for synchronization always receive the necessary synchronization signals. Even if no information is transmitted in the meantime, the connections between the network elements are maintained, for example by transmitting default messages, so that continuous synchronization is ensured.

A new situation arises if during section-by-section optical transmission, no time-invariable through-switching takes place. Then, optical connections are no longer permanently assigned to wavelengths. A flexible and time-variable assignment of optical channels to wavelengths is possible. For example, an optical channel for transmitting a first message packet is implemented by a first switched optical connection using a first wavelength, and an optical channel for transmitting a second message packet is implemented by a second switched optical connection using a second wavelength. If network elements with switching properties, such as optical cross-connects, are used in conjunction with wavelength-division multiplexing, arbitrary, time-variable optical channels can be created for transmitting information signals, such as SDH or SONET signals. For example, a first optical connection for creating a first optical channel is used in a first time period to transmit messages from a first network element to a second network element, with an optical cross-connect interposed between the network elements. The first optical connection is implemented using a first wavelength, for example. Via the interface unit assigned to the first wavelength, the second network element synchronizes itself, i.e., the sychronization clock, which corresponds to a bit-rate clock, is used for all interface units of the second network element. If in a second time period, the optical cross-connect uses the first wavelength for a second optical connection to create a second optical channel for transferring information from the first network element to a third network element, the connection to the second network element via the first wavelength is interrupted. The second network element can no longer synchronize itself in the second time period. Even if the second network element received information and/or synchronization signals over a second or third optical connection, it could not synchronize itself, because only the interface unit assigned to the first wavelength is reserved for the purpose of accomplishing synchronization for all interface units. Instead of using one interface unit, synchronization can also be achieved using two or three interface units, for example by means of an additional selection facility that selects the clock of the best quality. Through the use of three interface units for synchronization purposes in conjunction with three wavelengths, the probability that no synchronization is possible can be minimized but cannot be reduced to zero.

The invention proposes a synchronous digital communications system as set forth in claim 1 and a method of optically transmitting electric signals as set forth in claim 6.

The synchronous digital communications system according to the invention serves to transmit electric signals optically. The electric signals to be transmitted are converted from electrical to optical form and are then transmitted using wavelength-division multiplexing (WDM) or dense wavelength-division multiplexing (DWDM). A synchronization manager and a connection manager are provided. The synchronization manager is adapted to configure dedicated optical synchronization links. The connection manager is adapted to configure switched optical communication links from a pool of wavelengths taking account of the dedicated synchronization links only. This has the advantage that independently of the switched communication links, synchronization is constantly ensured throughout the system. Each network element has at least one interface unit that is reserved for synchronization and that constantly receives signals on the wavelength reserved for synchronization.

The synchronous digital communications system comprises, for example, at least three network elements interconnected by optical lines, each of the network elements comprising at least one electrical-to-optical converter and at least one optical-to-electrical converter. At least one optical cross-connect is connected between the network elements. Each optical cross-connect is adapted to use individual wavelengths for the switched transfer of signals from one network element to another. The cross-connect performs switching operations for communication links. With respect to the switching, however, the cross-connect is limited to those wavelengths which do not impair the established synchronization.

In a preferred embodiment, the synchronous digital communications system comprises at least three network elements designed as SDH or SONET elements that are interconnected by optical lines. Between the network elements, hierarchical synchronization or mutual synchronization is established by the synchronization manager. Prior to the switching of an optical communication link, the connection manager checks whether the established synchronization is impaired by the planned switching. If that is the case, the planned switching will not take place. An alternative link will be searched for. Only when a link that does not impair the established synchronization has been found will the switching take place. For instance, a reference clock generated in a first network element is transmitted for synchronization purposes to a second network element at a first wavelength. A clock derived from the received reference clock in the second network element is transmitted to a third network element at a second wavelength. Between the first and second network elements, the first wavelength is then reserved for the transfer of synchronization signals but can simultaneously be used for the transfer of information, maintenance and/or management signals. All other available wavelengths, e.g., twenty wavelengths, are used for the transfer of information signals over switched optical connections.

Prior to the switching of an optical connection, a check is made to see whether the first wavelength is concerned. If that should be the case and switching to another wavelength should be provided for without replacement, this would result in the synchronization being interrupted for the second network element and all subsequent network elements. Therefore, such switching will not be permitted. Between the second and the third network elements, the second wavelength is reserved for the transfer of synchronization signals and can additionally be used for the transfer of information. If a planned switching concerns the second wavelength in the area between the second and third network elements, this switching will not be permitted, either. Thus, there is at least one wavelength on each path between two network elements which serves synchronization purposes and therefore is, as a rule, not switchable. Synchronization is guaranteed throughout the system.

The synchronization manager and the connection manager have access to a stored table, for example, in which the topology of the synchronization links is stored. A criterion of an impairment of the established synchronization is, for example, a missing alternative synchronization link. The connection manager can perform the planned switching only if no or a tolerable impairment of the established synchronization is present.

The synchronization manager and the connection manager perform network management functions. During system design, the number of network elements, the number of possible optical connections, etc. are determined. For the synchronization, a topology is defined in the synchronization manager. For instance, master-slave synchronization is chosen. To implement this synchronization, the necessary paths are determined. In each network element, at least one interface unit is selected for synchronization. Each of the selected interface units is assigned one wavelength. This wavelength and the associated path are configured to create a path over which synchronization signals are constantly transmitted. After completion of the configuration of the synchronization links, the configuring of the communication links takes place. Information is transmitted over switched communication links and can additionally be transmitted over the synchronization links. The wavelengths reserved for the synchronization links are usable by the connection manager only limitedly, because special criteria have to be taken into account for the switching.

In the novel method of optically transmitting electric signals, the electric signals to be transmitted are converted from electrical to optical form and then transmitted using wavelength-division multiplexing, with dedicated optical synchronization links being configured, and switched optical communication links being configured from a pool of wavelengths ($\lambda_1$, $\lambda_n$) taking account of the dedicated synchronization links only.

In a specific logic, a check is made using predetermined criteria to see whether the planned switching of a communication link has an undesired effect on the synchronization links. If that is the case, the planned switching will be prevented.

Figure 2:
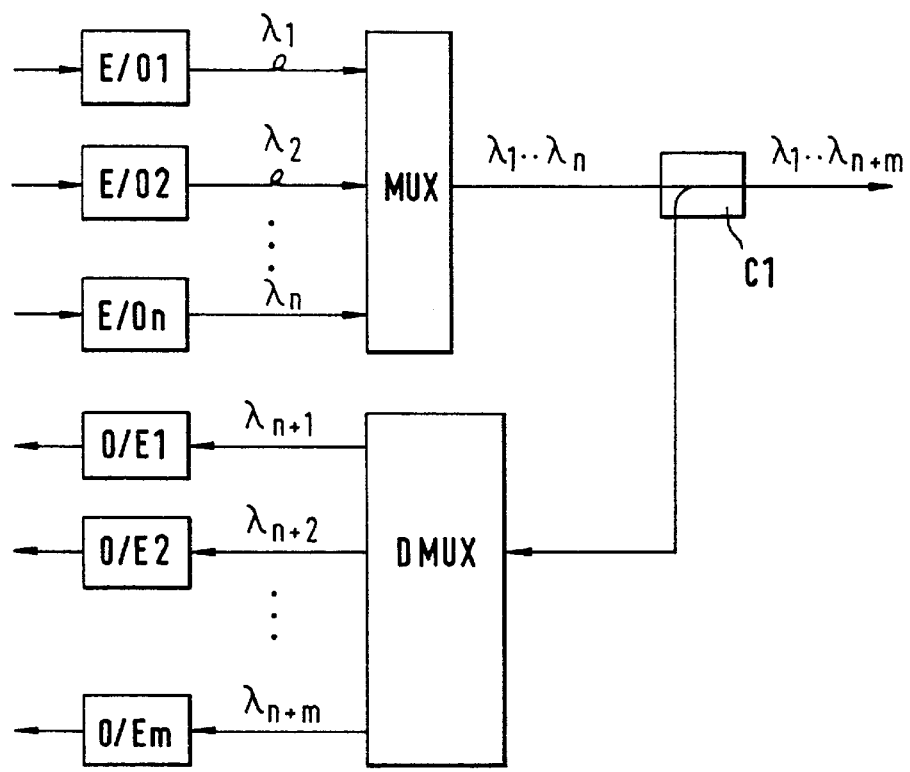

The invention will become more apparent from the following description of an embodiment taken in conjunction with the accompanying drawing, in which:

FIG. 1 is a schematic block diagram of a synchronous digital communications system according to the invention, and FIG. 2 is a schematic block diagram of a portion of the network element NE1 of FIG. 1.

Referring to FIG. 1, a synchronous digital communications system comprises three network elements NE1, NE2, NE3, which are interconnected by optical lines. Connected between network elements NE1, NE2, NE3 is an optical cross-connect O-XC. Over the optical lines, e.g., glass optical fibers, optical signals are transmitted using wavelength-division multiplexing (WDM) or dense wavelength-division multiplexing (DWDM). N+m wavelengths are provided. The communications system is designed as a bidirectional transmission system. Wavelengths $\lambda_1$ to $\lambda_n$ are used for the transmission of signals from network element NE1 to network elements NE2, NE3. Wavelengths $\lambda_{n+1}$ to $\lambda_{n+m}$ are used for the transmission of signals from network elements NE2, NE3 to network element NE1; n and m are natural numbers, e.g., n=20, m=20.

The communications system represents the minimum version of a system which permits WDM over multipoint-to-multipoint configurations. The invention is also readily applicable to communications systems with more than three network elements, e.g., one thousand network elements, which are interconnected by a mesh network of optical cross-connects and add/drop multiplexers, for example. Generally, the invention is applicable to any synchronous communications system which interconnects at least three electric subnetworks via an optical subnetwork such that switched optical connections are possible.

Turning now to FIG. 2, there is shown a portion of network element NE1 of FIG. 1. Network element NE1 comprises n electrical-to-optical converters E/O1, E/O2, . . . , E/On and m optical-to-electrical converters O/E1, O/E2, . . . , O/Em. The n electrical-to-optical converters E/O1, E/O2, . . . , E/On serve to convert the electric signals transmitted via the interface units of network element NE1 from electrical to optical form. To that end, the first interface unit is connected to and permanently associated with electrical-to-optical converter E/O1, the second interface unit is connected to and permanently associated with electrical-to-optical converter E/O2, etc. Each electrical-to-optical converter E/O1, E/O2, . . . , E/On generates a different wavelength. All wavelengths $\lambda_1$ to $\lambda_n$ are combined in a multiplexer MUX, which is implemented as an optical combiner, for example. The combined wavelengths are simultaneously transmitted over the optical network. The optical cross-connect switches optical connections in accordance with their destination addresses. If, for example, information is to be transferred over an optical connection to network element NE2, optical cross-connect O-XC will switch the necessary number of optical connections using wavelengths, e.g., wavelengths $\lambda_2$ and $\lambda_3$. If, for example, information is to be transferred over a further optical connection to network element NE3, optical cross connect O-XC will switch the necessary number of optical connections using wavelengths, e.g., $\lambda_4$ and $\lambda_5$. In a further time period, information can, for instance, be transferred to network element NE2 at wavelengths $\lambda_2$ and $\lambda_5$ and to network element NE3 at wavelengths $\lambda_3$ and $\lambda_4$. To continuously ensure synchronization in the network, at least one optical connection is reserved for the permanent transfer of synchronization signals using wavelength $\lambda_1$, for example. A generally nonswitched optical connection is configured, for example using wavelength $\lambda_1$ from network element NE1 to optical cross-connect O-XC and wavelength $\lambda_1$ or another wavelength from optical cross-connect O-XC to network element NE2. A further, generally nonswitched optical connection is configured, for example using wavelength $\lambda_2$ from network element NE1 to optical cross-connect O-XC and wavelength $\lambda_2$ or another wavelength from optical cross-connect O-XC to network element NE3. In the presence of special criteria, the optical connection can be switched. Electrical-to-optical converter E/O1 and electrical-to-optical converter E/O2 are supplied with a synchronization clock generated in a primary reference source. The synchronization clock is transmitted to network element NE2 at the reserved wavelength $\lambda_1$ and to network element NE3 at the reserved wavelength $\lambda_2$. Both network elements NE2, NE3 synchronize themselves to the incoming clock signal.

Network element NE1 receives information from network elements NE2 and NE3 via a fiber optic coupler C1 and a demultiplexer DMUX, which selects individual wavelengths and passes them on to optical-to-electrical converters O/E1, O/2, . . . , O/Em. Fiber optic coupler C1 extracts all wavelengths $\lambda_{n+1}$ to $\lambda_{n+m}$ from the optical fiber; n and m may also have different values. Demultiplexer DMUX is implemented as a wavelength-dependent splitter, for example. Each optical-to-electrical converter O/E1, O/E2, . . . , O/Em converts a different wavelength and passes the corresponding electric signal to a respective one of the interface units of network element NE1. If the master-slave approach (hierarchical synchronization) is used, all wavelengths $\lambda_{n+1}$ to $\lambda_{n+m}$ can be used for the transfer information signals from network elements NE2 and NE3 to network element NE1. If mutual synchronization is used, a total of six optical connections, for example, are reserved for the synchronization signals: a first optical connection for the transfer of synchronization signals from network element NE1 to network element NE2, a second for transfer from network element NE1 to network element NE3, a third for transfer from network element NE2 to network element NE1, a fourth for transfer from network element NE2 to network element NE3, a fifth for transfer from network element NE3 to network element NE1, and a sixth for transfer from network element NE3 to network element NE2. For each optical connection, individual wavelengths can be reserved: for example, wavelength $\lambda_{n+1}$ for the transfer of synchronization signals from network element NE2 to network element NE1, wavelength $\lambda_{n+2}$ for the transfer of synchronization signals from network element NE2 to optical cross-connect O-XC, and wavelength $\lambda_3$ for transfer from optical cross-connect O-XC to network element NE3. These optical connections are nonswitched connections and can therefore be used for information transfers only limitedly. The other wavelengths, which are not used for the transfer of synchronization signals, can then be used for the transfer of information over arbitrarily switched optical connections.

A synchronization manager and a connection manager are provided. They perform network management functions. During system design, the number of network elements, the number of possible connections, etc. are determined. For the synchronization, a topology is defined in the synchronization manager. For instance, master-slave synchronization is chosen. To implement this synchronization, the necessary paths are determined. In each network element NE1, NE2, NE3, at least one interface unit is selected for synchronization. If two or more interface units are selected, two or more alternative synchronization paths can be established. Each of the selected interface units is assigned one wavelength. This wavelength and the associated path are configured such that a path is established over which synchronization signals are continuously transmitted. After completion of the configuration of the synchronization links, the communication links are configured. Information is transferred over the switched communication links and can additionally be transferred over the synchronization links. The wavelengths reserved for the synchronization links are usable by the connection manager only limitedly, since particular criteria must be taken into account for the switching.

The synchronization manager and the connection manager have access to a stored table, for example, in which the topology of the synchronization links is stored. A criterion of an impairment of the established synchronization is, for example, a missing alternative synchronization link. The connection manager can perform the planned switching only if no or a tolerable impairment of the established synchronization is present. Criteria of a permission for such switching are, for example:

No information, but synchronization signals are being transferred over the optical connection to be switched, and there exists a second optical connection, over which synchronization signals are transferred, so that synchronization can be maintained.

Neither information nor synchronization signals are being transferred over the optical connection to be switched, and there exists no alternative synchronization link, but the loss of synchronization can be tolerated due to special circumstances, e.g., last network element in a chain for which no information is present.

Neither information nor synchronization signals are being transferred over the optical connection to be switched, and there exists no alternative synchronization link, but the new, planned optical connection provides a new synchronization link that can replace the old one.

Information and synchronization signals are being transferred over the optical connection to be switched, and the new, planned optical connection provides a new synchronization link that can replace the old one.

In addition to the above criteria, which represent a possible selection, the structure of the changed synchronization network should always be checked for compliance with the corresponding design rules before the permission to switch is granted.

In the novel method of optically transmitting electric signals, the electric signals to be transmitted are converted from electrical to optical form and then transmitted using wavelength-division multiplexing, with dedicated optical synchronization links being configured and switched optical communication links being configured from a pool of wavelengths $\lambda_1$, $\lambda_n$ taking account of the dedicated synchronization links only.

In a specific logic, comprising, for example, a suitably programmed microprocessor, a memory, a comparator, etc., a check is made using predetermined criteria to see whether the planned switching of a communication link has an undesired effect on the synchronization links. If that is the case, the planned switching will be prevented.

If mutual synchronization is used, two, three, or four interface units of network element NE1, for example, are reserved for synchronization purposes and are permanently associated with electrical-to-optical converters and optical-to-electrical converters. During mutual synchronization, all signals are used and their relative weight for the synchronization is determined by an algorithm. With two or more alternative and nearly equivalent synchronization links, individual planned switchings of communication links which relate to synchronization links can be permitted as long as an equivalent alternative synchronization link is maintained.

What is claimed is:

1. A synchronous digital communications system for optically transmitting electric signals wherein the electric signals to be transmitted are converted from electrical to optical form (E/O1, E/O2, E/On) and then transmitted using wavelength-division multiplexing, wherein the improvement comprises:

a synchronization manager adapted to configure dedicated optical synchronization links to provide electric signal synchronization between network elements, and a connection manager adapted to configure switched optical communication links between network elements from a pool of wavelengths ($\lambda_1, \lambda_n$) taking account only of which of the wavelengths ($\lambda_1, \lambda_n$) are configured as the dedicated synchronization links by said synchronization manager.

2. A communications system as claimed in claim 1, further comprising:

at least three network elements (NE1, NE2, NE3), each network element comprising at least one electrical-to-optical converter (E/O1, E/O2, E/On), and at least one optical-to-electrical converter (O/E1, E/E2, O/Em), where said at least three network elements are interconnected by optical lines via at least one optical cross-connect (O-XC), and said at least one optical cross-connect (O-XC), connected between the network elements (NE1, NE2, NE3), wherein said at least one optical cross-connect O-XC) is adapted to use individual wavelengths ($\lambda_2, \lambda_n$) for the switched transfer of information signals from one network element (NE1, NE2, NE3) to another network element (NE1, NE2, NE3).

3. A communications system as claimed in claim 1, further comprising:

at least three network elements (NE1, NE2, NE3) interconnected by optical lines wherein the network elements (NE1, NE2, NE3) are SDH or SONET elements, wherein the synchronization manager is adapted to establish hierarchical synchronization or mutual synchronization between the network elements (NE1, NE2, NE3), and wherein the connection manager is adapted to check, prior to the switching of an optical communication link, whether the established synchronization is impaired by the planned switching.

4. A communications system as claimed in claim 3, further comprising:

a stored table in which a topology the synchronization links is stored, wherein the synchronization manager and/or the connection manager has access to said stored table, and wherein a criterion of an impairment of the established synchronization is a missing alternative synchronization link.

5. A communications system as claimed in claim 3, wherein the connection manager performs the planned switching only if no or a tolerable impairment of the established synchronization is present.

6. A method of optically transmitting electric signals wherein the electric signals to be transmitted are converted from electrical to optical form (E/O1, E/O2, E/On) and then transmitted using wavelength-division multiplexing, comprising steps of:

configuring dedicated optical synchronization links to provide electric signal synchronization between network elements, and configuring switched optical communication links from a pool of wavelengths ($\lambda_1, \lambda_n$) taking account only of which of the wavelengths ($\lambda_1, \lambda_n$) are configured as the dedicated optical synchronization links.

7. A method as claimed in claim 6, further comprising:

checking, in a specific logic, using predetermined criteria to see whether a planned switching of a communication link will have an undesired effect on the synchronization links, and preventing the planned switching if said step of checking determines that the planned switching would have the undesired effect on the synchronization links.

* * * * *